Jan. 22, 1963  H. J. W. BROCK  3,074,603
DISPENSING DEVICE
Filed Sept. 30, 1959  5 Sheets-Sheet 1
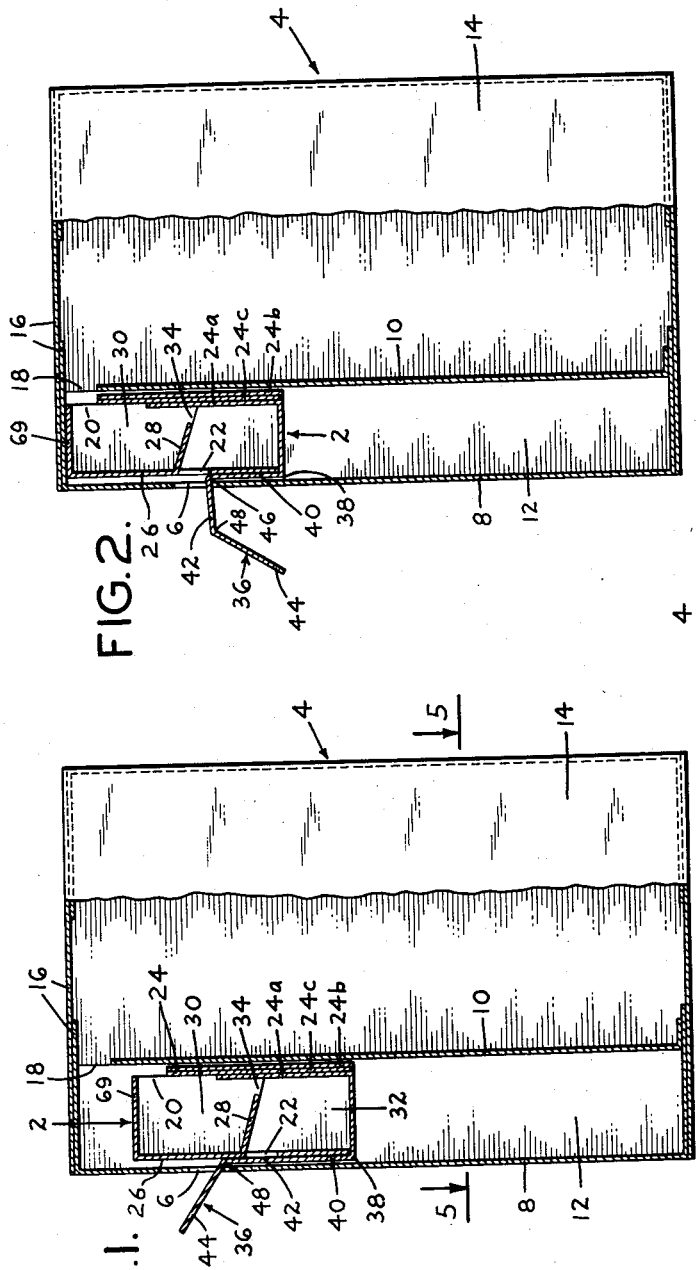
INVENTOR
HENDRIKUS JOHANNES WILLEM BROCK
BY
Brumbaugh, Free, Graves & Donohue
HIS ATTORNEYS

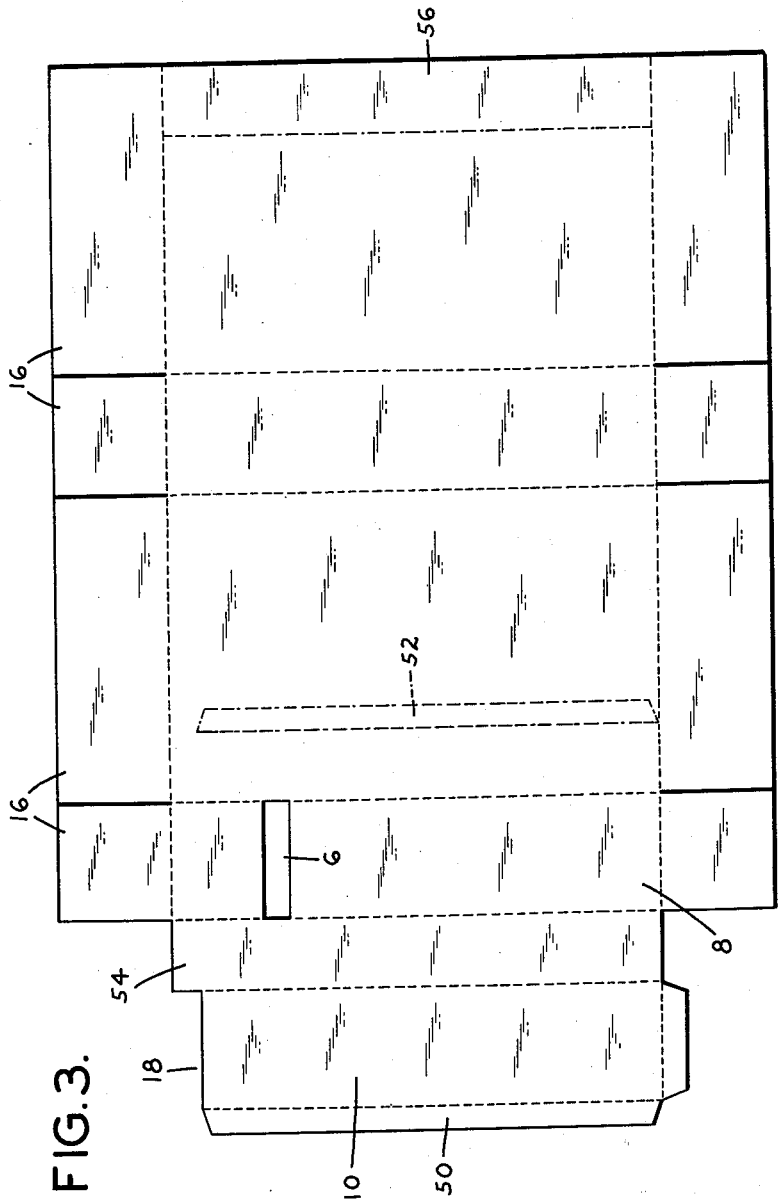

Jan. 22, 1963 H. J. W. BROCK 3,074,603
DISPENSING DEVICE
Filed Sept. 30, 1959 5 Sheets-Sheet 3

INVENTOR
HENDRIKUS JOHANNES WILLEM BROCK
BY
Brumbaugh, Free, Graves & Donohue
HIS ATTORNEYS

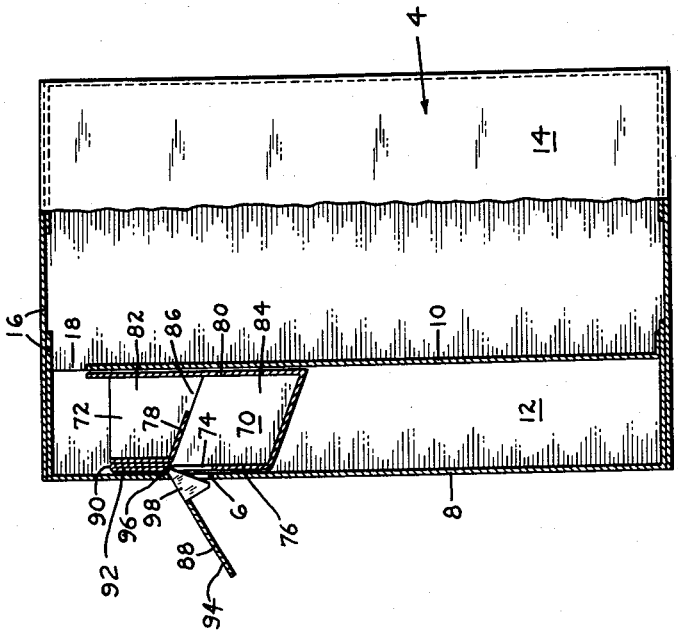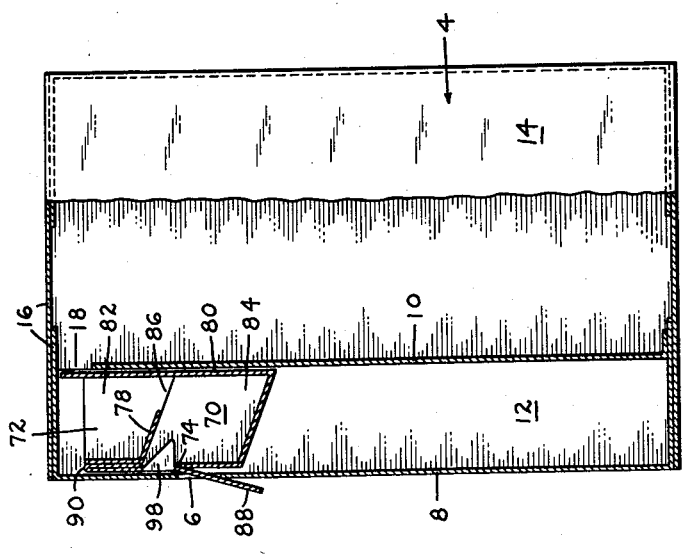

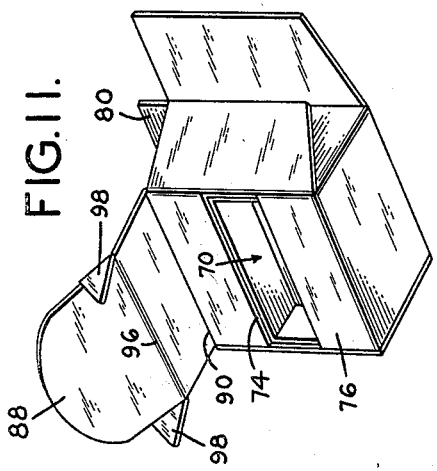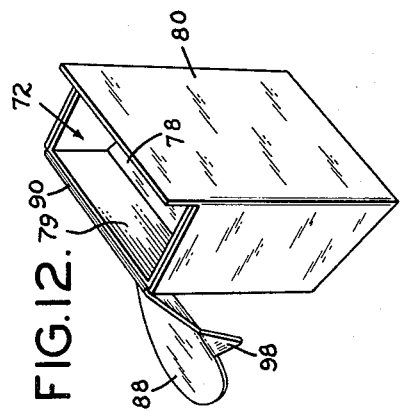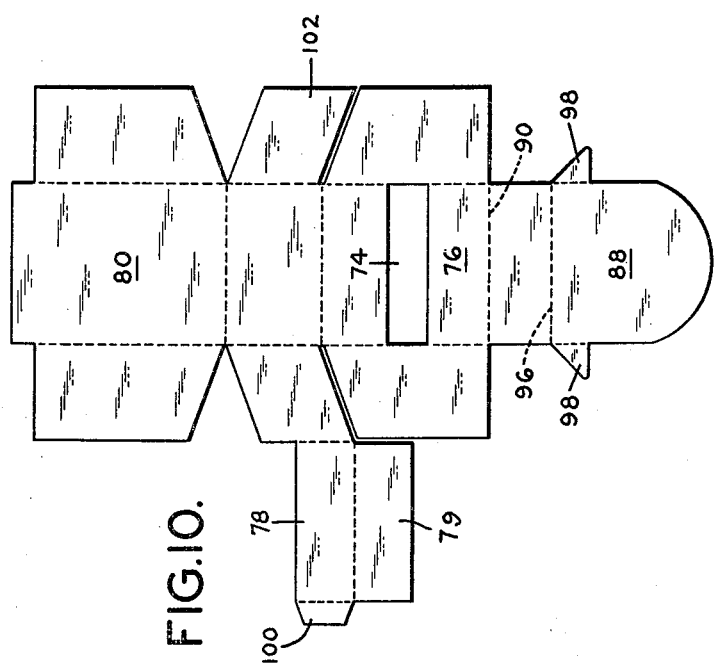

ing to the invention with the dosing chamber in a first position with the inlet aperture closed;

FIG. 2 illustrates partly in section the container of FIG. 1 with the dosing chamber in a second position;

FIG. 3 shows a blank from which the receptacle of the container of FIG. 1 is assembled;

FIG. 5 is a section view taken along line 5—5 of FIG. 1;

FIG. 8 is a partial section view of a modification of the invention showing a first position for the dosing chamber;

FIG. 9 is a partial section view of a modification of the invention showing a second position for the dosing chamber;

FIG. 10 is a blank from which the dosing chamber of FIG. 8 is assembled;

FIG. 11 is a bottom perspective view of a partially erected dosing chamber of the embodiment of FIG. 8; and FIG. 12 is a top perspective view of a partially erected dosing chamber of the embodiment of FIG. 8.

Figure 6:
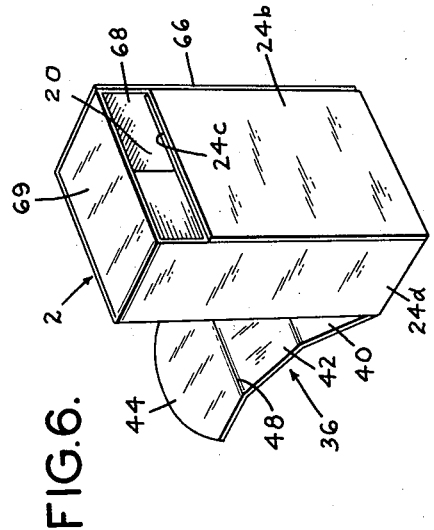
FIG. 6 illustrates in perspective a partially assembled dosing chamber according to the invention.

Referring to FIGS. 1 and 2, the clearances between the relatively moving surfaces of the dosing chamber 2 and the receptacle chamber 4 have been deliberately exaggerated for the sake of clarity, and the fit is actually designed to be a sliding one.

The receptacle 4 is in the form of a rectangular cardboard carton, completely closed, except for a discharge orifice 6 which is formed near the top of a narrow front wall 8. An internal partition 10 parallel to the front wall 8 divides the carton into a first compartment 12 and a second compartment 14. The partition 10 stops short of the top wall 16 of the carton to form a transfer orifice 18 between the compartments 12 and 14.

The dosing chamber 2 is made of cardboard and is formed to a rectangular parallelepiped shape having a sliding fit within the first compartment 12. The dosing chamber 2 is completely closed except for an inlet aperture 20 and an outlet aperture 22, FIGS. 1 and 2, in opposing front and back walls 24 and 26, respectively. The inlet aperture 20 is at the top of the back wall 24 while the outlet aperture 22 is just over halfway down the front wall 26. An internal baffle 28 extends downwardly and inwardly from the top lip of the outlet aperture 22 to within a short distance of the back wall 24, thus dividing the dosing chamber 2 into an upper area 30 and a lower area 32 in communication with each other through an intermediate aperture 34.

A tab 36, FIG. 2, extends upwards from a bottom front edge 38, adjacent wall 26 of the dosing chamber 2. The tab has three portions 40, 42 and 44. The portion 40 is always parallel to the front wall 8 of the receptacle 4 and is disposed between the front wall 8 and the wall 26 of the dosing chamber 2. The portion 42 is separated from the portions 40 and 44 by fold lines 46 and 48 respectively. The portion 44 always projects out of the receptacle 4 at the discharge orifice 6, and the portions 40, 42 and 44 together form the actuating means for moving the dosing chamber between its first and second positions.

In the first position of the dosing chamber 2 (FIG. 1), the fold line 48 is adjacent to the lower lip of the discharge orifice 6 with both the portions 40 and 42 disposed between the walls 8 and 26. In this position the outlet aperture 22 of the dosing chamber 2 is closed by the portion 42, and the inlet aperture 20 is closed by the top part of the partition 10.

United States Patent Office 3,074,603
Patented Jan. 22, 1963

3,074,603
DISPENSING DEVICE
Hendrikus Johannes Willem Brock, Bexleyheath, England, assignor to Lever Brothers Company, New York, N.Y., a corporation of Maine
Filed Sept. 30, 1959, Ser. No. 843,556
Claims priority, application Great Britain Oct. 3, 1958
10 Claims. (Cl. 222—455)

This invention relates to containers for dispensing predetermined volumes of comminuted material.

Containers comprising a receptacle and a dosing chamber for dispensing predetermined volumes of comminuted material are known in which the arrangement is such that in use, when the filled container is inverted and then restored to its original position, the dosing chamber is charged with a predetermined volume of comminuted material. On the next inversion of the container this predetermined volume is discharged.

A container of this type can have the disadvantage that due to vibration and other movement during transit of the filled container, the dosing chamber may become charged with a greater volume of comminuted material than the predetermined volume it is desired to dispense in one dose. The first dose will then be inaccurate, and may in some cases, be excessively large. A container of the type referred to can have the further disadvantage that when it is nearly empty the doses may become very inaccurate, and in some cases excessively small.

It is an object of the present invention to provide an improved container of the type referred to in which one or both of the above disadvantages are reduced.

It is a further object of the invention to provide an improved dosing chamber designed to obviate the latter of the above disadvantages.

According to the objects of the invention, a container is provided having a receptacle chamber and a dosing chamber, the dosing chamber being provided with an inlet aperture and an outlet aperture, and means for initially closing the inlet aperture, the arrangement being such that when the receptacle portion is filled and the inlet aperture closed, the dosing chamber is prevented from being charged with comminuted material. Preferably, there is an actuating means operable from the outside of the container for opening the inlet aperture.

The dosing chamber may be made movable relative to the receptacle chamber from a first position in which the inlet aperture is closed to a second position in which the inlet aperture is open. The actuating means can then be arranged to move the dosing chamber from the first to the second position, or to return it to the first position.

Means may be provided for closing the outlet aperture, and the arrangement can be such that when the dosing chamber is in the first or second position, the outlet aperture is respectively closed or opened.

The receptacle may be divided into a first and second compartment with partition between the two compartments, the dosing chamber being slidable in the first compartment, and the second compartment being to retain the comminuted material to be dispensed.

It is contemplated that the receptacle and dosing chambers may be formed each from a single cardboard blank, and are designed to have a minimum number of seams. The dosing chamber when assembled may be designed to have only one seam.

Other objects and advantages will become apparent upon further consideration of the specification and accompanying drawings in which:

FIG. 1 illustrates partly in section a container accord-

In the second position of the dosing chamber 2 (FIG. 2), the fold line 46 is adjacent to the lower edge of the discharge orifice 6 and the portion 42 projects, together with the portion 44, out of the receptacle 4 through orifice 6. In this position, the outlet aperture 22 is open by being in alignment with the discharge orifice 6, and the inlet aperture 20 is open by being in alignment with the transfer orifice 18.

The receptacle 4 is erected from the blank shown in FIG. 3. This blank is designed so that it can be partially erected into a form in which it can be folded flat with the partition 10, FIG. 1, in position. This is advantageous when it is necessary to transport the carton before it is filled. The blank in this partially erected state is shown diagrammatically in cross-section in FIG. 5, with the partition 10 dividing chamber 4 into compartments 12 and 14, and is erected into this form by folding through a right angle along each of the fold lines indicated by broken lines in FIG. 3, and then gluing the flap 50 to the area 52, and the portion 54 to the area 56. The other fold lines are shown by dotted lines.

Figure 4:
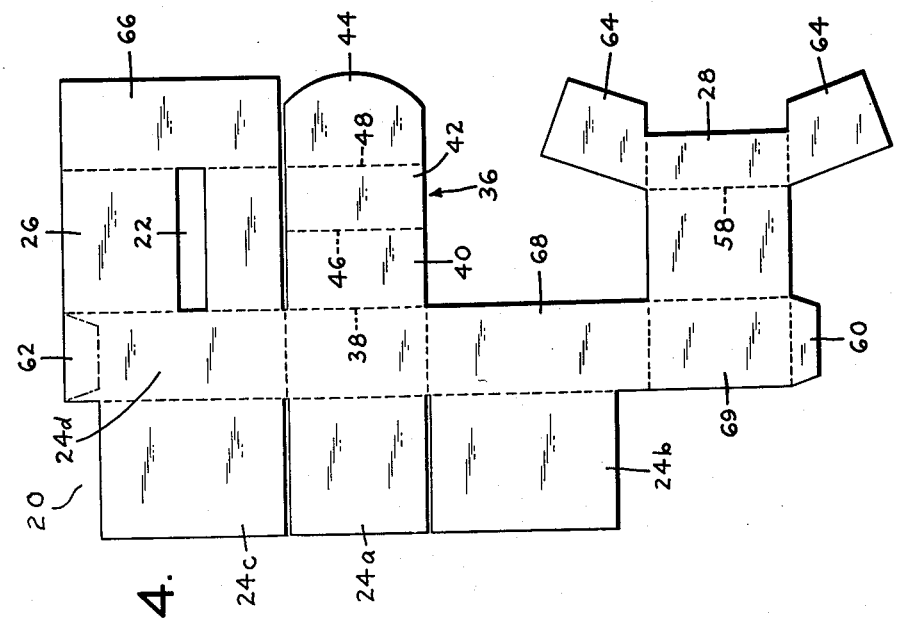
FIG. 4 shows a blank from which the dosing chamber of the container of FIG. 1 is assembled.

The dosing chamber 2 is erected from the blank shown in FIG. 4 by folding through a right angle along each of the fold lines shown in broken lines with the exception of fold line 58 about which the adjacent parts are only folded through an angle of about 75°. The only gluing that is necessary, is that of a flap 60 to the area 62 to form the only seam in the dosing chamber 2. Note in FIG. 4, the position of inlet and outlet apertures 20 and 22 in the back and front walls 24c and 26 respectively.

Figure 7:
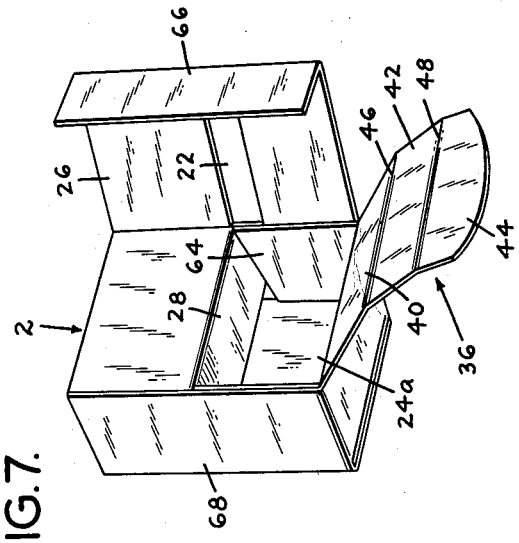
FIG. 7 is a different prespective view of the dosing chamber of FIG. 6.

FIGS. 6 and 7 show in perspective, a partially erected dosing chamber, and illustrate the manner in which the blank is folded to erect the chamber. After flap 60 is glued to area 62, the necessary folds having been made, the flap 28 and flaps 64 are folded over and inserted into the erected position clearly shown in FIG. 7, fold line 58 being creased at an angle of about 75°. Then flap 24a is folded upwardly to butt against flaps 64, and flaps 24c and 24b fold inwardly in that order to overlie flap 24a to form the back wall 24 of the chamber and inlet aperture 20, as illustrated in FIG. 6. In this erected position, the side walls are formed by flaps 68 and 24d. The tab 36 is then folded upwardly, FIG. 7 and flaps 26 and 66 fold over such that, the latter overlies side wall 68, the former forming the front wall of the chamber.

When the dosing chamber 2 has been completely erected it is slid into the compartment 12 of the receptacle 4 before the ends of the receptacle are closed and sealed. The close co-operation of the outside of the dosing chamber 2 with the side walls of the compartment 12 retains the chamber 2 in its erected form without the need for gluing except for the flap 60.

The dosing chamber 2 is moved into the first position by means of the actuating tab 36 inserted through discharge orifice 6, and the bottom of the receptacle is closed and sealed. The compartment 14 is then filled with comminuted material, such for example as a fine powder, and the top of the receptacle sealed. The dosing chamber 2 is thus empty when the carton is filled and will remain so while in the first position. When it is desired to use the container for the first time, the portion 44 of the tab 36 is pulled upwards and the dosing chamber 2 pulled into the second position, the portion 44 together with the portion 42 then being folded downwards. The container is then inverted and a predetermined volume of comminuted material flows from the compartment 14 through the transfer orifice 18 and the inlet aperture 20 into the upper chamber 30. On restoring the container to its original position, the volume of material in the upper chamber 30 flows through the intermediate aperture 34 into the lower chamber 32. When the container is again inverted the predetermined volume of material is discharged from the lower chamber 32 through the outlet aperture 22 and the discharge orifice 6. On each subsequent inversion of the container a substantially equal volume of material will be discharged.

It will be evident that the predetermined volume with which the chamber 2 is charged each time may be different with different comminuted materials depending upon the flowable characteristics of the materials.

If it is desired to close the device again, e.g. for travelling, the dosing chamber 2 can be moved back to the first position by folding the tab portion 42 upwards and then by means of the portion 44 pushing the tab portion 42 downwards into the receptacle, moving the dosing chamber to a first position. There will, however, be a dose of the comminuted material in the dosing chamber 2, but as the inlet aperture is closed no more material can pass from the compartment 14 into the chamber 2 to increase this dose and as the outlet aperture 22 is also closed this dose cannot accidentally be discharged.

As a modification of the above, the dosing chamber may be constructed as shown in FIG. 11 cooperating with the receptacle as shown in FIGS. 8 and 9, in first and second positions, respectively.

Referring to FIG. 8, the receptacle 4 is again comprised of a discharge orifice 6, front wall 8, partition 10, first and second compartments 12 and 14, top wall 16, and transfer orifice 18. The dosing chamber 70 in FIG. 8 is again shown slidingly mounted in the first compartment 12. In this embodiment of the invention, the dosing chamber is formed to a trapezoidal configuration having an open top 72 and an outlet aperture 74, FIG. 9, in front wall 76. The chamber is again provided with an internal baffle 78 extending downwardly and inwardly from the top lip of the outlet aperture 74 to within a short distance of the back wall 80, again dividing the dosing chamber into an upper area 82 and a lower area 84, in communication with each other through an intermediate aperture 86.

A tab 88, FIG. 2, is provided extending downwards from an upper front edge 90 of the front wall 76, divided into two sections 92 and 94 by fold line 96, the portion 94 projecting out of the discharge orifice 6. In the first position of the dosing chamber (FIG. 8), the dosing chamber is forced upwardly so that tab 88 is held substantially parallel to the front wall 8 of the receptacle and drawn partially within the orifice 6 closing over the dosing chamber aperture 74 to prevent the escape of material therefrom. The tab may be additionally provided with side projections 98 adapted to more fully seal the aperture 74. The back wall 80 of the dosing chamber is also specifically dimensioned such that it is in contact with the top wall 16 of the receptacle completely closing transfer orifice 18 to prevent passage of material from the receptacle to the dosing chamber.

In the second postion of the dosing chamber (FIG. 9), the chamber 70 and tab 88 are displaced downwardly until chamber outlet aperture 74 is aligned with the receptacle discharge orifice 6. In this position, the fold line 96 of the tab 88 is exposed such that the tab can be bent upwardly to expose the outlet aperture 74. In this position, it is also apparent that the transfer orifice 18 is opened to permit material to pass from the receptacle 4 to the upper area 82 of the dosing chamber 70.

The functioning of the dosing chamber and receptacle is the same as that described with respect to the embodiment of FIG. 1, with the exception of the use of the tab 88, which is pulled in a downward direction to open the outlet aperture rather than up. It is evident that the dosing chamber can be charged with the same predetermined volume in the same way, and that the dosing chamber can be as readily positioned in the same way to prevent accidental discharge or overcharging thereof.

FIG. 10 illustrates a blank from which the dosing chamber is erected by folding along the indicated dotted fold lines. The only flap to be glued, is flap 100 to area 102. FIG. 11 illustrates the partially erected chamber showing the manner in which the flaps are folded and positioned with respect to each other. Again the necessary folds are made so that flap 100 may be glued to area 102, flap 78 forming the intermediate partition 78, FIG. 12, flap 79 being bent upwardly forming an angle of about 75° with flap 78. Then flaps 76 and 80 are folded upwardly towards each other with their respective side flaps folded inwardly to overlie each other and to form the side walls of the chamber and the erected positions shown in FIGS. 11 and 12. Again the close co-operation of the outside of the dosing chamber with the side walls of the compartment 12 of the receptacle retains the chamber in its erected form.

I claim:

1. A device for dispensing comminuted material comprising a receptacle having a discharge orifice and a storage compartment for the comminuted material, a dosing chamber comprising an inlet aperture and an outlet aperture, means for moving said dosing chamber relative to the receptacle from a first position in which the outlet and inlet apertures are closed to a second position in which the outlet aperture is in communication with said discharge orifice and the inlet aperture is in communication with said storage compartment, the dosing chamber being adapted in this second position to receive a predetermined volume of comminuted material on inversion of the container from its normal orientation and then on the next inversion of the container from its normal orientation to discharge this volume of comminuted material through said discharge orifice.

2. A device for dispensing comminuted material comprising a receptacle having a discharge orifice and a storage compartment for the comminuted material, a dosing chamber comprising parallel side walls and having inlet and outlet apertures in said side walls, means for moving said dosing chamber relative to the receptacle in a direction parallel to said side walls from a first position in which the inlet aperture is closed to a second position in which the outlet aperture is in communication with said discharge orifice and the inlet aperture is in communication with said storage compartment, the dosing chamber being adapted in this second position to receive a predetermined volume of comminuted material on inversion of the container from its normal orientation and then on the next inversion of the container from its normal orientation to discharge this volume of comminuted material through said discharge orifice.

3. A device for dispensing comminuted material, comprising a receptacle having a discharge orifice and a storage compartment for the comminuted material, a dosing chamber comprising side walls, one of said side walls containing an outlet aperture, means for moving said dosing chamber relative to the receptacle in a direction parallel to said side wall which contains said outlet aperture, said dosing chamber further comprising an inlet aperture in an end portion of the dosing chamber transverse to said direction, said dosing chamber further being movable relative to the receptacle from a first position in which the inlet aperture is closed to a second position in which the outlet aperture is in communication with said discharge orifice and the inlet aperture is in communication with said storage compartment, the dosing chamber being adapted in this second position to receive a predetermined volume of comminuted material on inversion of the container from its normal orientation and then on the next inversion of the container from its normal orientation to discharge this volume of comminuted material through said discharge orifice.

4. A device for dispensing comminuted material comprising a receptacle having a discharge orifice and a storage compartment for the comminuted material, a dosing chamber comprising an inlet aperture and an outlet aperture, means for moving said dosing chamber relative to the receptacle from a first position in which the inlet aperture is closed to a second position in which the outlet aperture is in communication with said discharge orifice and the inlet aperture is in communication with said storage compartment, means closing the outlet aperture when said dosing chamber is in said first position, the dosing chamber being adapted in the second position to receive a predetermined volume of comminuted material on inversion of the container from its normal orientation and then on the next inversion of the container from its normal orientation to discharge this volume of comminuted material through said discharge orifice.

5. A device for dispensing comminuted material comprising a receptacle having a discharge orifice and a storage compartment for the comminuted material, a dosing chamber having an inlet aperture and an outlet aperture, means for moving said dosing chamber relative to the receptacle from a first position in which the inlet aperture is closed to a second position in which the outlet aperture is in communication with said discharge orifice and the inlet aperture is in communication with said storage compartment, the dosing chamber being adapted in this second position to receive a predetermined volume of comminuted material on inversion of the container from its normal orientation and then on the next inversion of the container from its normal orientation to discharge this volume of comminuted material through said discharge orifice, said inlet aperture being located adjacent the top of the storage compartment when said dosing chamber is in said second position and when said container is in said normal orientation.

6. A device for dispensing comminuted material comprising a receptacle having a discharge orifice and a storage compartment for the comminuted material, a dosing chamber having an inlet aperture and an outlet aperture, means for moving said dosing chamber relative to the receptacle from a first position in which the inlet aperture is closed to a second position in which the outlet aperture is in communication with said discharge orifice and the inlet aperture is in communication with said storage compartment, the dosing chamber being adapted in this second position to receive a predetermined volume of comminuted material on a first inversion of the container from its normal orientation and then on the next inversion of the container from its normal orientation to discharge this volume of comminuted material through said discharge orifice, a baffle extending partially across said chamber and separating the chamber into a first space and a second space so that on said first inversion of the container the predetermined volume of the comminuted material passes into the first space and on restoring the container to its normal orientation this volume of comminuted material is transferred to said second space from which it is discharged on said next inversion.

7. A device for dispensing comminuted material comprising a receptacle having a discharge orifice and a storage compartment for the comminuted material, a dosing chamber comprising parallel side walls having inlet and outlet apertures therein, means for moving said dosing chamber relative to the receptacle in a direction parallel to said side walls from a first position in which the inlet and outlet apertures are closed to a second position in which the outlet aperture is in communication with said discharge orifice and the inlet aperture is adjacent the top of the storage compartment when the container is in its normal orientation and is in communication with said storage compartment, the dosing chamber being adapted in said second position to receive a predetermined volume of comminuted material on a first inversion of the container from said normal orientation and then on the next inversion of the container from its normal orientation to discharge the volume of comminuted material through said discharge orifice.

8. A container according to claim 7 comprising a baffle extending partially across and separating the chamber into a first space and a second space so that on said first inversion of the container the predetermined volume of comminuted material passes into said first space and on restoring the container to its normal orientation this volume of comminuted material is transferred to said second space from which it is discharged on said next inversion.

9. A device for dispensing comminuted material comprising a receptacle having a partition forming first and second compartments therein, a discharge orifice in said second compartment, a transfer orifice in the partition between said compartments, a dosing chamber movable in said second compartment and having first and second positions therein, said dosing chamber comprising inlet and outlet apertures which are closed in said first position and which are in communication with said transfer orifice and said discharge orifice respectively in said second position, said dosing chamber being adapted in said second position to receive a predetermined volume of comminuted material from said first compartment on inversion of the device from its normal orientation and then on the next inversion of the device from its normal orientation to discharge this volume of comminuted material through said discharge orifice.

10. A device as claimed in claim 9 in which said dosing chamber includes a tab means projecting through said discharge orifice of the receptacle for aiding in moving said dosing chamber between said first and second positions.

References Cited in the file of this patent

UNITED STATES PATENTS

| | | |
|---|---|---|
| 1,273,012 | Souther | July 16, 1918 |
| 1,320,429 | Wackman et al. | Nov. 4, 1919 |
| 1,520,017 | Denton | Dec. 23, 1924 |
| 2,318,812 | Spilo | May 11, 1943 |
| 2,455,962 | Wheeler et al. | Dec. 14, 1948 |